United States Patent Office 3,511,791
Patented May 12, 1970

3,511,791
DENTURE ADHERENT PREPARATION
Bruno Puetzer, Tuckahoe, Leonard Mackles, New York, and Alexander V. Finn, Staten Island, N.Y., assignors to Tintex Corporation, % Revlon, Inc., New York, N.Y., a corporation of Delaware
No Drawing. Continuation-in-part of application Ser. No. 260,051, Feb. 20, 1963. This application Jan. 30, 1967, Ser. No. 612,307
Int. Cl. C08f 29/00
U.S. Cl. 260—17.4                              7 Claims

ABSTRACT OF THE DISCLOSURE

A denture adherent having an acrylamide polymer as its principal adhesive component. The polymer may be combined with an anti-caking agent when compounded for use in powder form or with a hydrophobic petrolatum when a paste is desired. It is preferred to use some natural gum in both the paste and powder formulations.

---

This is a continuation-in-part of application Ser. No. 260,051 filed Feb. 20, 1963 and now abandoned.

This invention relates in general to denture adherents, and more particularly to an improved composition which can be prepared in either paste or powder form, and which is characterized by a pure white color, no taste, and sustained adherence in use without swelling.

Heretofore, the major proportion of all commercially available denture adherents have employed gum karaya as the basic adhesive component. As an adhesive, this natural gum has been considered to perform in a satisfactory manner, but being a sugar attackable by mouth enzymes, it loses its adhesive properties with time, and its characteristic brown color is a drawback to marketing experts as well as to the user. Moreover, when gum karaya is placed on a denture plate and moistened, it appears as an unappealing dark brown stain. Prior workers have attempted to alleviate this problem by mixing the gum karaya with other natural gums, such as gum arabic and gum tragacanth, but while these materials do lessen the intensity of the brown color, a quantity thereof sufficient to materially affect color also reduces the adhesive power of the mixture.

Alternative adhesive materials have also been employed in an effort to overcome the color problem of gum karaya, as for example methyl cellulose and hydroxy ethyl cellulose. These materials are white in color and water soluble, but their adhesive properties, again, are not as good as those of gum karaya. While the various compositions above are generally prepared in powder form, adherent pastes are also available, these generally comprising a combination of gum karaya and petrolatum or a similar hydrophobic excipient base material. An additional problem with paste compositions and also some powders is that, after a period of use, they tend to swell and squeeze out around the edges of the denture and into the mouth of the wearer and may even be ingested in part. While all denture adherents are safe to swallow, this creates an unpleasant effect from the standpoint of the user and particularly the novice user of dentures.

Due to the astringent taste of certain of the ingredients in many of the presently available denture adherents, a flavoring agent is generally added. This may be wintergreen oil, peppermint oil, or any like materials, and while this does impart the desired flavor to the preparation, the wearer is kept aware of the presence of the adherent by the presence of a continual "taste" in his mouth; a completely tasteless preparation, therefore, being desirable.

It is the object of the present invention to provide new and improved denture adherent compositions which are white in color and assume a transparent form, i.e., colorless, when moistened in use.

A further object of the invention is to provide a denture adherent which possesses adhesive properties capable of comfortably retaining dentures over an extended period with but a single application.

A still further object of the invention is to provide a denture adherent which is absolutely tasteless and odorless.

Yet another object of the invention is to provide a denture adherent which will not swell during use such as to ooze out from behind the denture.

A still further object of the invention is to provide a denture adherent which is instantly ready to use when moistened, that is, an adherent which has a fast "grab."

Lastly, a still further object of the invention is to provide a denture adherent which achieves all of the foregoing objects and which can be prepared in either paste or powder form to suit the choice or habit of various users.

Various other objects and advantages of the invention will appear from the following description of several typical embodiments of the invention.

Briefly, the present invention is based, at least in part, on the discovery that copolymers of acrylamide and acrylic acid or homopolymers of acrylamide having a high molecular weight as, for example, within the range of approximately 5 to 6 million, may be formulated into a denture adhesive or adherent which carries out all of the foregoing objects and is superior to conventional denture adherents in substantially all respects. This material is completely non-toxic, and may be readily combined with a pharmaceutically non-toxic anti-caking agent when compounded for use in powder form or, when a paste product is desired, a hydrophobic petrolatum or similar oil base. Additionally, a minor proportion of a natural gum such as gum karaya may be added to the composition with the result that the properties of the adherent are still further improved, but without the aforementioned disadvantages of these materials when employed alone as denture adherents. As noted in detail hereinafter, truly outstanding results have been obtained with certain combinations of the polyacrylamide adherent of the invention and gum karaya, apparently due to a synergistic effect brought about by the combination.

Typical of the polyacrylamides which may be employed in the invention are the materials manufactured by the American Cyanamid Company under the trademark "Cyanamer," and which may be represented by the formula:

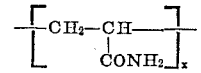

Specifically, Cyanamer P26 and Cyanamer P250 (trademarks) have been found completely satisfactory for use in the invention. The former is a relatively low-molecular weight anionic copolymer of acrylamide and acrylic acid, and the latter is a nonionic homopolymer of acrylamide with a molecular weight between about 5 and 6 million. These acrylamides are described in American Cyanamid Co., Market Development Dept. Brochure 9236 dated June 1959.

Heretofore, these materials have been employed in a variety of industrial applications, including, for example, use as thickeners for water-base paints, waterproofing, of cinder blocks, as flocculants and as beneficial additives to portland cement, finely-ground ores, and electrolysis solutions. None of these applications, however, even remotely suggest that the polymeric materials meet the criteria of color, taste, nontoxicity, strong adhesive qualities, quick grab, firm and smooth gel, gel strength, etc., required for an improved denture adherent.

Toxicity studies has been conducted on acrylamide polymers including, in one case, a two-year feeding program on rats and dogs, and all indications are that these products are non-toxic, both acutely and sub-acutely.

As noted hereinabove, for the adhesive component, the acrylamide polymers can be used either by themselves or in combinations with natural gums such as gum karaya, gum acacia, gum tragacanth, gum arabic and locust bean gum. In the combination the acrylamide polymer is employed as the principal adhesive component. When the acrylamide polymer is used as the basic or principal adhesive component in an adherent composition it has been found that at least about 30 percent of acrylamide polymer in the formula is necessary to carry out the objects of the invention. Below about 30 percent acrylamide polymer as the principal adhesive component, the composition does not exhibit the important features of a denture adherent of fast grab and strong adhesive qualities.

A powder prepared according to the invention will contain from 30 to 99 percent polyacrylamide, 0 to 70 percent natural gums, and 0 to 5 percent of a suitable pharmaceutically non-toxic anti-caking agent, such as air-floated silica, magnesium stearate, talcum powder, or the like. The preferred proportion of polyacrylamide is from 60 to 80 percent, with 73 percent considered optimum.

A paste prepared according to the invention will contain from 30 to 45 percent polyacrylamide, 0 to 35 percent natural gums, and 55 to 90 percent petrolatum, mineral, animal or vegetable oils, waxes or the like.

It is also preferred to use at least some natural gum in both the paste and powder formulations of the invention due to the synergistic effect produced thereby. While not wishing to be bound by a particular theory of operation, it is believed that the electrostatic properties of pure polyacrylamide detract somewhat from its effectiveness, but this problem is overcome by the addition of a gum. It is believed that a synergistic effect takes place between polyacrylamide and gum karaya and that interaction in the form of hydrogen bonding takes place to provide a substantial improvement in gel strength, adhesiveness and firmness and smoothness of the gel.

In preparing the product of the invention it is important for optimum results that the polyacrylamide be micronized so that it is substantially 100 percent minus 200 mesh. This insures a fast "grab" with no feeling of graininess or grittiness in the powder form, and also insures that the paste will have a smooth consistency and be similarly fast-acting.

While the paste formulation is white due to the color of the polyacrylamide, it is to be noted that the powder becomes transparent when moistened. Thus, when the powder is applied to a moist denture, it becomes invisible; this property, along with its lack of taste and odor, and its strong, sustained gripping power combine to provide a very substantial improvement over prior-art denture adhesives. Of course, any suitable color or flavor additives can be used if desired, such, for example, as a pink coloring agent to match the usual "gum" coloring imparted to dentures.

As set forth fully in the examples appended hereinbelow, the powder of the invention is used by sprinkling it lightly on the moist denture, which is then pressed into position in the wearer's mouth. The adhesive bond is immediately produced and lasts up to one day or longer. Upon removal of the denture, the adherent can be cleaned therefrom with any conventional denture cleanser. The paste formulation of the invention, which is conveniently supplied in a nasal-tipped collapsible tube, is applied to the dry denture by squeezing short strips into the inside of the front and sides of the denture. In all other respects use of the paste is the same as the powder.

A more complete understanding of the invention may be had by referring to the following specific examples illustrating typical formulations of the invention utilizing the foregoing principles and procedures.

EXAMPLE I 100 grams of coarse nonionic polyacrylamide of an average molecular weight of approximately 5 to 6 million (Cyanamer P250—trademark) are ground and passed through a 200-mesh per inch sieve. This material is used as a denture adhesive powder as such, and also with the addition of 1 percent of either magnesium stearate, talcum powder or air-floated silica (Santocel FRC—trademark) to give it better flow characteristics. Appropriate flavoring and coloring materials are added to the powder mix, without any deleterious effects.

EXAMPLE II

In a ribbon blender, 73 pounds of finely-ground nonionic homopolymer of acrylamide with an average molecular weight of approximately 5 to 6 million (Cyanamer P250—trademark) are intimately mixed with 24.5 pounds of pure powdered gum karaya and 2.5 pounds of air-floated silica (Santocel FRC—trademark). Equivalent powder mixing equipment can, of course, be used. The blending is continued for about thirty minutes until a uniform free-flowing white product is obtained ready for packaging. In use as a denture adhesive the powder is lightly sprinkled on the moist denture, the denture is firmly pressed into position for a few second to produce a secure and comfortable fit lasting for from many hours to up to one day. In a study on 46 subjects for a period of four weeks, and totalling more than 3,500 single applications, this product produced no signs of local irritation, sensitization or gastro-intestinal disturbances and proved to be more effective as to its adhesive powers than a comparable preparation containing karaya gum only.

EXAMPLE III 50 grams of powdered tragacanth and 50 grams of nonionic homopolymer of acrylamide with an average molecular weight of 5 to 6 million (Cyanamer P250—trademark) are intimately mixed and used as in Example II. Gum karaya, gum acacia, gum arabic, locus bean gum, gelatin, starch and other comparable hydrophilic colloids may also be employed in this formulation.

EXAMPLE IV

In a pony mixer, 43 pounds of white petrolatum USP and 27 pounds of white mineral oil USP are melted at a temperature of 82° C. To the agitated mixture 30 pounds of micronized nonionic homopolymer of acrylamide, with an average molecular weight of 5 to 6 million (Cyanamer P250—trademark), are gradually added until a smooth homogeneous white paste is obtained. The manufacture of this product can also be carried out in an ointment mill. The paste is dispensed by means of collapsible tubes and used according to the following directions: The dentures are cleaned and drier and three or more short strips of the paste are squeezed onto the inside of the front and two sides of the plate. The denture is then pressed firmly in position for a few seconds to give a comfortable fit lasting for from several hours to up to one day.

Other similar formulations ranging in acrylamide polymer content from 30 to 45 percent were prepared, using as water insoluble excipients various mineral, animal or vegetable oils, waxes, etc., and combinations thereof, and the results proved equally satisfactory.

It will be understood that various changes in the details, materials, steps and compositions, which have been herein described in order to explain the nature of the invention, may be made by those skilled in the art within the principle and scope of the invention as expressed in the appended claims.

What is claimed is:

1. A denture adherent preparation that comprises in combination,
   from 30 to 80 percent of a homopolymer of acrylamide, and
   up to 70 percent of a hydrophilic natural gum.

2. The denture adherent preparation of claim 1 in which there is further provided up to 5 percent of a pharmaceutically non-toxic anti-caking agent.

3. The denture adherent preparation of claim 1 in which said natural gum is karaya gum.

4. A denture adherent preparation that comprises in combination,
   from 60 to 80 percent of a homopolymer of acrylamide,
   up to 35 percent of a hydrophilic natural gum, and
   up to 5 percent of a pharmaceutically non-toxic anti-caking agent.

5. The denture adherent preparation of claim 4 wherein
   said natural gum is selected from the group consisting of karaya gum, tragacanth gum, acacia gum, arabic gum and locus bean gum, and
   said anti-caking agent is selected from the group consisting of air-floated silica, magnesium stearate and talcum powder.

6. A denture adherent preparation that comprises, in combination,
   from 30 to 45 percent of a homopolymer of acrylamide,
   up to 35 percent of a hydrophilic natural gum, and
   from 55 to 90 percent of a water-insoluble excipient material.

7. The denture adherent preparation of claim 6 wherein
   said water insoluble excipient material is selected from the group consisting of animal, vegetable and mineral oils and waxes.

References Cited

UNITED STATES PATENTS

| | | | |
|---|---|---|---|
| 2,574,476 | 11/1951 | Heath et al. | 106—207 |
| 2,701,212 | 1/1955 | Brennan | 106—35 XR |
| 2,745,813 | 5/1956 | Logemann et al. | 260—29.6 |
| 2,997,399 | 8/1961 | Eberhard et al. | 106—35 |

WILLIAM H. SHORT, Primary Examiner

E. NIELSEN, Assistant Examiner

U.S. Cl. X.R.

106—35; 156—328; 260—23, 41